US008830933B2

(12) United States Patent
Feng et al.

(10) Patent No.: US 8,830,933 B2
(45) Date of Patent: Sep. 9, 2014

(54) METHOD FOR COMMUNICATING BY USING A CONVERGENCE CARRIER WAVE, ACCESS NETWORK DEVICE, AND TERMINAL

(75) Inventors: Shulan Feng, Beijing (CN); Jinnan Liu, Beijing (CN); Haiguang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 333 days.

(21) Appl. No.: 13/279,715

(22) Filed: Oct. 24, 2011

(65) Prior Publication Data
US 2012/0087323 A1    Apr. 12, 2012

Related U.S. Application Data

(63) Continuation of application No. PCT/CN2009/071645, filed on May 5, 2009.

(51) Int. Cl.
H04W 74/04 (2009.01)
H04W 72/04 (2009.01)
H04W 72/12 (2009.01)
H04L 5/00 (2006.01)
H04W 48/12 (2009.01)

(52) U.S. Cl.
CPC .............. *H04W 48/12* (2013.01); *H04W 72/04* (2013.01); *H04L 5/0041* (2013.01); *H04L 5/0039* (2013.01); *H04L 5/0005* (2013.01)
USPC ........... 370/329; 370/252; 370/350; 370/312; 370/343; 455/450

(58) Field of Classification Search
CPC ..... H04W 48/10; H04W 28/26; H04W 48/12; H04W 16/14; H04W 72/00; H04L 5/0039; H04L 5/0005; H04L 5/0041
USPC ......... 370/252, 254, 255, 312, 315, 319, 350, 370/329, 330, 432, 343, 380; 455/450
See application file for complete search history.

(56) References Cited

U.S. PATENT DOCUMENTS 5,956,642 A    9/1999 Larsson et al.
8,195,174 B2 *  6/2012 Lee et al. ................ 455/450
(Continued)

FOREIGN PATENT DOCUMENTS

CN    1245623 A    2/2000
CN    1753399 A    3/2006
(Continued)

OTHER PUBLICATIONS

International Search Report from the Chinese Patent Office in International Application No. PCT/CN2009/071645 mailed Feb. 25, 2010.
(Continued)

*Primary Examiner* — Ahmed Elallam
(74) *Attorney, Agent, or Firm* — Conley Rose. P.C.; Grant Rodolph; Nicholas K. Beaulieu

(57) ABSTRACT

A method for communicating by using a convergence carrier wave, an access network device and a terminal are provided. The method includes: scheduling a synchronizing signal and a broadcasting signal of a system onto a first available transmission frequency segment of a convergence carrier wave to transmit the synchronizing and the broadcasting signal to a terminal, where the convergence carrier wave includes at least two available transmission frequency segments, and a bandwidth of the convergence carrier wave is smaller than or equal to the maximum working bandwidth of the system; determining to use the at least two available transmission frequency segments of the convergence carrier wave to communicate with the terminal; and communicating with the terminal on the at least two available transmission frequency segments of the convergence carrier wave.

21 Claims, 5 Drawing Sheets

(56) References Cited

U.S. PATENT DOCUMENTS

| | | | |
|---|---|---|---|
| 8,295,236 B2 * | 10/2012 | Ishii et al. | 370/329 |
| 8,379,587 B2 * | 2/2013 | Parkvall et al. | 370/329 |
| 8,526,373 B2 * | 9/2013 | Ishii et al. | 370/329 |
| 8,532,035 B2 * | 9/2013 | Moon et al. | 370/329 |
| 8,532,050 B2 * | 9/2013 | Awad | 370/330 |
| 2005/0232137 A1 | 10/2005 | Hosur et al. | |
| 2006/0116123 A1 | 6/2006 | Purnadi et al. | |
| 2006/0281465 A1 | 12/2006 | McBeath et al. | |
| 2010/0008317 A1 * | 1/2010 | Bhattad et al. | 370/329 |
| 2010/0182972 A1 * | 7/2010 | Katayama et al. | 370/329 |

FOREIGN PATENT DOCUMENTS

| | | |
|---|---|---|
| CN | 101091410 A | 12/2007 |
| CN | 101127719 A | 2/2008 |
| CN | 101189903 A | 5/2008 |
| CN | 101228726 A | 7/2008 |
| CN | 101330372 A | 12/2008 |
| CN | 101765208 A | 6/2010 |
| WO | WO 2010/121417 A1 | 10/2010 |

OTHER PUBLICATIONS

Rajbanshi, et al., "An Efficient Implementation of NC-OFDM Transceivers for Cognitive Radios", Information and Telecommunication Technology Center, IEEE, pp. 1-5, (2006).

Chou, et al., "Mobility Management with Multi-Carrier Support in IEEE 802.16m", IEEE 802.16 Broadband Wireless Access Working Group, IEEE C802.16x-08/144r2, pp. 1-8, (Mar. 10, 2008).

Cho, et al., "Proposed 802.16m Frame Structure for multi-carrier support", IEEE 802.16 Broadband Wireless Access Working Group, http://ieee802.org/16, IEEE C802.16m-08/264r3, pp. 1-5, (May 15, 2008).

NTT DOCOMO, Inc., "Updated Views on Support of Wider Bandwith in LTE-Advanced", 3GPP TSG RAN WG1 Meeting #43bis, R1-083677, pp. 1-21, Sep. 29-Oct. 3, 2008.

Panasonic, "Non-backward compatible component carriers for asymmetric carrier aggregation", 3GPP TSG RAN WG1 Meeting #55, R1-084221, pp. 1-3, (Nov. 10-14, 2008).

Foreign Communication From A Counterpart Application, PCT Application PCT/CN2009/071384, Written Opinion of the International Searching Authority dated Jan. 28, 2010, 4 pages.

Foreign Communication From A Counterpart Application, PCT Application PCT/CN2009/071645, Written Opinion of the International Searching Authority dated Feb. 25, 2010, 5 pages.

Foreign Communication From a Counterpart Application, Chinese Application 200980148068.1, Chinese Office Action dated Jan. 7, 2013, 7 pages.

Foreign Communication From a Counterpart Application, Chinese Application 200980148068.1, Partial English Translation of First Chinese Office Action dated Jan. 7, 2013, 6 pages.

* cited by examiner

METHOD FOR COMMUNICATING BY USING A CONVERGENCE CARRIER WAVE, ACCESS NETWORK DEVICE, AND TERMINAL

CROSS-REFERENCE TO RELATED APPLICATIONS

This application is a continuation of International Application No. PCT/CN2009/071645, filed on May 5, 2009, which is hereby incorporated by reference in its entirety.

FIELD OF THE INVENTION

The present invention relates to the field of communication technologies, and in particular, to a method for communicating by using a convergence carrier wave, an access network device, and a terminal.

BACKGROUND OF THE INVENTION

With growing wireless data services, a requirement on a wireless data transmission rate becomes higher. For example, a new generation of a wireless communication system is required generally to support a downlink rate not lower than 1 Gbps and an uplink rate not lower than 500 Mbps.

In order to implement a high data transmission rate, in one aspect, a frequency spectrum utilization ratio may be improved as much as possible by using the technologies, for example, high order modulation technology, multi-antenna technology, or multiplexing technology; in another aspect, a data transmission bandwidth may be increased as much as possible. As a frequency spectrum resource is very limited, for an operator, it is more essential to improve a utilization ratio of the frequency spectrum resource occupied by a system as much as possible.

A system of an operator may occupy multiple available frequency segments, and an available frequency segment may also be referred as an available carrier wave. The multiple available carrier waves occupied by the system may be continuous or non-continuous. A scenario of multiple continuous available carrier waves may be as shown in FIG. 1a. The multiple available carrier waves shown in FIG. 1a are continuous on a frequency spectrum. A scenario of multiple non-continuous available carrier waves may be as shown in FIG. 1b. The multiple available carrier waves shown in FIG. 1b are non-continuous on a frequency spectrum.

In the prior art, for a system of the operator, no matter the multiple available carrier waves occupied by the system are continuous or non-continuous, each available carrier wave adopts an independent working mode. That is to say, each available carrier wave transmits a synchronizing signal and a broadcasting signal thereof separately, which increases complexity of system implementation and is bad for saving resources.

SUMMARY OF THE INVENTION

Embodiments of the present invention provide a method for communicating by using a convergence carrier wave, an access network device, and a terminal, so as to improve a frequency spectrum resource utilization ratio and decrease complexity of data processing.

A method for communicating by using a convergence carrier wave includes:

scheduling a synchronizing/broadcasting signal of a system onto a first available transmission frequency segment of a convergence carrier wave to transmit the synchronizing/broadcasting signal to a terminal, where the convergence carrier wave includes at least two available transmission frequency segments, and a bandwidth of the convergence carrier wave is smaller than or equal to the maximum working bandwidth of the system; determining to use the at least two available transmission frequency segments of the convergence carrier wave to communicate with the terminal; and communicating with the terminal on the at least two available transmission frequency segments of the convergence carrier wave.

A method for communicating by using a convergence carrier wave includes:

receiving a synchronizing signal and a broadcasting signal of a system sent by an access network device using a first available transmission frequency segment of a convergence carrier wave, and synchronizing with the system; determining to use at least two available transmission frequency segments of the convergence carrier wave to communicate with the access network device; and communicating with the access network device on the at least two available transmission frequency segments of the convergence carrier wave.

An access network device includes:

a synchronization and broadcasting module, configured to schedule a synchronizing/broadcasting signal of a system onto a first available transmission frequency segment of a convergence carrier wave to transmit the synchronizing/broadcasting signal to a terminal, where the convergence carrier wave includes at least two available transmission frequency segments, and a bandwidth of the convergence carrier wave is smaller than or equal to the maximum working bandwidth of the system; a determination module, configured to determine to use the at least two available transmission frequency segments of the convergence carrier wave to communicate with the terminal; and a first communication module, configured to communicate with the terminal on the at least two available transmission frequency segments of the convergence carrier wave.

A terminal includes:

a synchronization module, configured to receive a synchronizing signal and a broadcasting signal that are of a system and are sent by an access network device using a first available transmission frequency segment of a convergence carrier wave, and synchronize with the system; a determination module, configured to determine to use at least two available transmission frequency segments of the convergence carrier wave to communicate with the access network device; and a first communication module, configured to communicate with the access network device on the at least two available transmission frequency segments of the convergence carrier wave.

It can be seen from the technical solutions that, the technical solutions according to the embodiments of the present invention have the following advantages: a convergence carrier wave including at least two available transmission frequency segments may work as a whole, so that the access network device may communicate with the terminal on the at least two available transmission frequency segments of the convergence carrier wave, and does not need to transmit the synchronizing/broadcasting signal in all available transmission frequency segments of the convergence carrier wave, therefore improving a frequency spectrum resource utilization ratio and decreasing complexity of data processing.

BRIEF DESCRIPTION OF THE DRAWINGS

To illustrate the technical solutions according to the embodiments of the present invention and in the prior art more clearly, the accompanying drawings required for describing the embodiments and the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

Embodiments of the present invention provide a method for communicating by using a convergence carrier wave, an access network device, and a terminal, so that the access network device can communicate with the terminal using the convergence carrier wave, therefore relatively improving a frequency spectrum resource utilization ratio and decreasing complexity of data processing.

Detailed descriptions are provided below through specific embodiments.

Figure 1A:
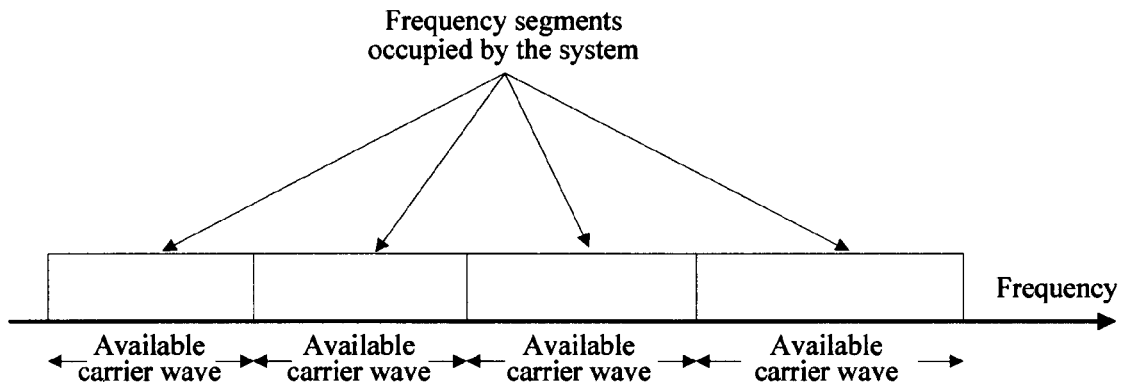
FIG. 1a is a schematic diagram of a scenario of multiple continuous carrier waves according to the prior art.
Figure 1B:
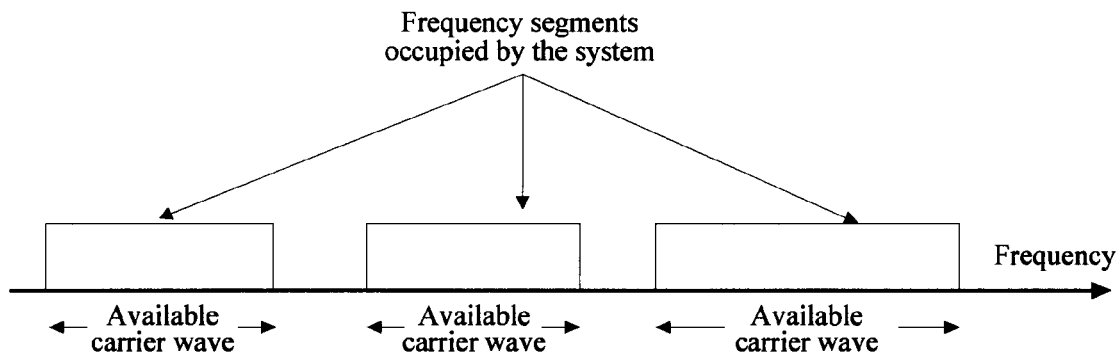
FIG. 1b is a schematic diagram of a scenario of multiple non-continuous carrier waves according to the prior art.
Figure 2:
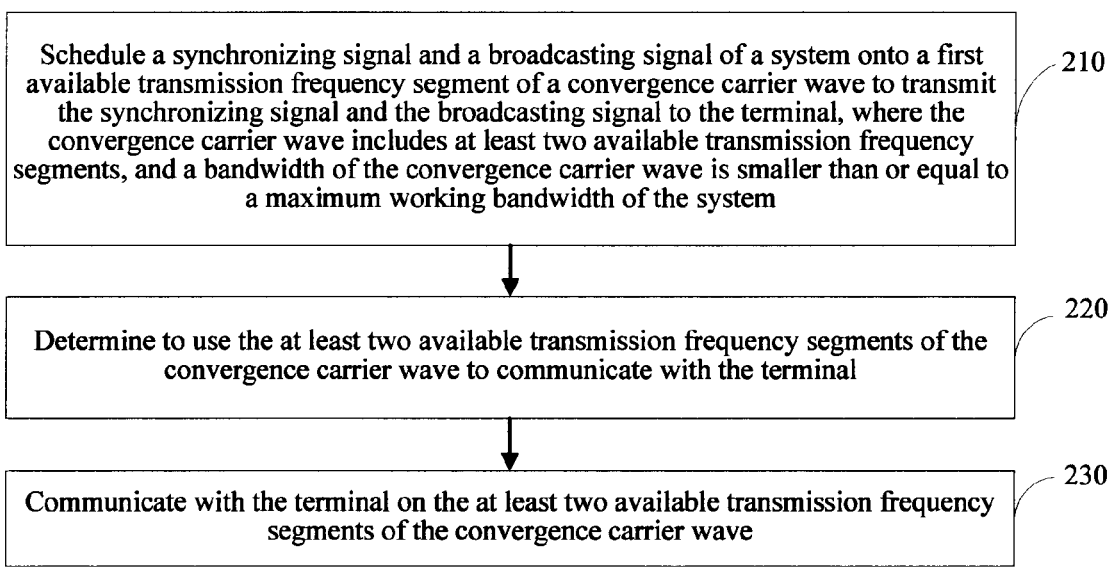
FIG. 2 is a schematic flow chart of a method for communicating by using a convergence carrier wave according to Embodiment 1 of the present invention.

Referring to FIG. 2, a method for communicating by using a convergence carrier wave according to Embodiment 1 of the present invention may include as follows.

210: Schedule a synchronizing signal and a broadcasting signal of a system onto a first available transmission frequency segment of a convergence carrier wave to transmit the synchronizing/broadcasting signal to the terminal, where the convergence carrier wave includes at least two available transmission frequency segments, and a bandwidth of the convergence carrier wave is smaller than or equal to the maximum working bandwidth of the system.

The convergence carrier wave may either be a continuous available convergence carrier wave or a non-continuous available convergence carrier wave. The continuous available convergence carrier wave includes at least two continuous available transmission frequency segments, and the non-continuous available convergence carrier wave includes at least two non-continuous available transmission frequency segments. Definitely, the convergence carrier wave may further include one or more unavailable transmission frequency segments.

For a specific system, each frequency segment of the convergence carrier wave may be an available transmission frequency segment or may be an unavailable transmission frequency segment. For example, for a system A, a frequency segment 1 of the convergence carrier wave is an available frequency segment, while for a system B, the frequency segment 1 may be an unavailable transmission frequency segment.

In an application scenario, the first available transmission frequency segment of the convergence carrier wave may be an available transmission frequency segment where a central frequency of the convergence carrier wave is located, or may be another available transmission frequency segment of the convergence carrier wave.

220: Determine to use the at least two available transmission frequency segments of the convergence carrier wave to communicate with the terminal.

Multiple manners may be used for determining to use the at least two available transmission frequency segments of the convergence carrier wave to communicate with the terminal, thereby ensuring consistency of a communication pace of two communication parties.

In an application scenario, the determining manner may be: sending a startup message to the terminal, where the startup message carries indication information indicating that the at least two available transmission frequency segments of the convergence carrier wave are used to communicate with the terminal.

A major usage of the startup message is: notifying the terminal of a situation that a startup message sender is going to use the at least two available transmission frequency segments of the convergence carrier wave to communicate with the terminal. By receiving the startup message, the terminal learns that the startup message sender is going to use the at least two available transmission frequency segments of the convergence carrier wave to communicate with the terminal, and makes preparation for the communication.

Therefore, the indication information carried in the startup message may be any information capable of indicating the terminal that the startup message sender is going to use the at least two available transmission frequency segments of the convergence carrier wave to communicate with the terminal.

In an application scenario, the indication information carried in the startup message may include one or more pieces of the following information: bandwidth information of the convergence carrier wave, frequency spectrum information of the at least two available transmission frequency segments of the convergence carrier wave, or a startup indication signal of 1 bit or several bits, which is not limited herein.

The startup message may further include: start time information of using the at least two available transmission frequency segments of the convergence carrier wave for communication. The start time may be time of a next frame or next sub-frame following a radio frame or radio sub-frame carrying the startup message, or time after multiple radio frames or multiple sub-frames.

A process of determining may further include: receiving a startup acknowledgment message, where the startup acknowledgment message is sent by the terminal after the terminal correctly receives the startup message. The startup acknowledgment message may carry an acknowledgment signal that the terminal accepts the using the at least two available transmission frequency segments of the convergence carrier wave for communication, and/or the start time information of using the at least two available transmission frequency segments of the convergence carrier wave for communication.

Definitely, both communication parties may appoint in advance the start time information of using the at least two available transmission frequency segments of the convergence carrier wave for communication.

230: Communicate with the terminal on the at least two available transmission frequency segments of the convergence carrier wave.

On the at least two transmission available frequency segments of the convergence carrier wave, transmission resources may be assigned for uplink data and/or downlink data, so as to send the downlink data to the terminal and/or receive the uplink data sent by the terminal.

The assigning the transmission resources for the uplink data and/or downlink data of the terminal on the at least two transmission available frequency segments of the convergence carrier wave refers to that, when resources are assigned, resources that may be considered are the at least two available transmission frequency segments of the convergence carrier wave. However, an actual resource scheduling result may be that the resources are merely partial or all resources on one available transmission frequency segment of the at least two available transmission frequency segments of the convergence carrier wave, or partial or all resources on multiple available transmission frequency segments.

The uplink data of the terminal may includes one or more types of the following data: service data, layer 1/layer 2 (L1/L2) control signaling of the system, and upper layer control signaling of the system.

The technical solutions may be implemented on an access network device of a communication system. The access network device may be a base station, a base station controller, or other devices with similar functions in the communication system; the terminal may be a mobile phone, a Personal Digital Assistant (PDA), a portable computer, a wireless network card, or other devices with similar communication functions, which is not limited in the present invention.

The technical solutions of the embodiment of the present invention may be applied to multiple communication systems such as a Wideband Code Division Multiple Access (WCDMA) system, a Time Division-Synchronous Code Division Multiple Access (TD-SCDMA) system, a Code Division Multiple Access-2000 (CDMA2000) system, a Long Term Evolution (LTE) system, an LTE-9 system, an LTE-A system and other upgrade systems, which is not limited herein.

It can be seen from the technical solutions that, a convergence carrier wave including at least two available transmission frequency segments in the embodiment may work as a whole, so that the access network device may communicate with the terminal on the at least two available transmission frequency segments of the convergence carrier wave, and does not need to transmit the synchronizing/broadcasting signal in all available transmission frequency segments of the convergence carrier wave, therefore improving a frequency spectrum resource utilization ratio and decreasing complexity of data processing.

Figure 3:
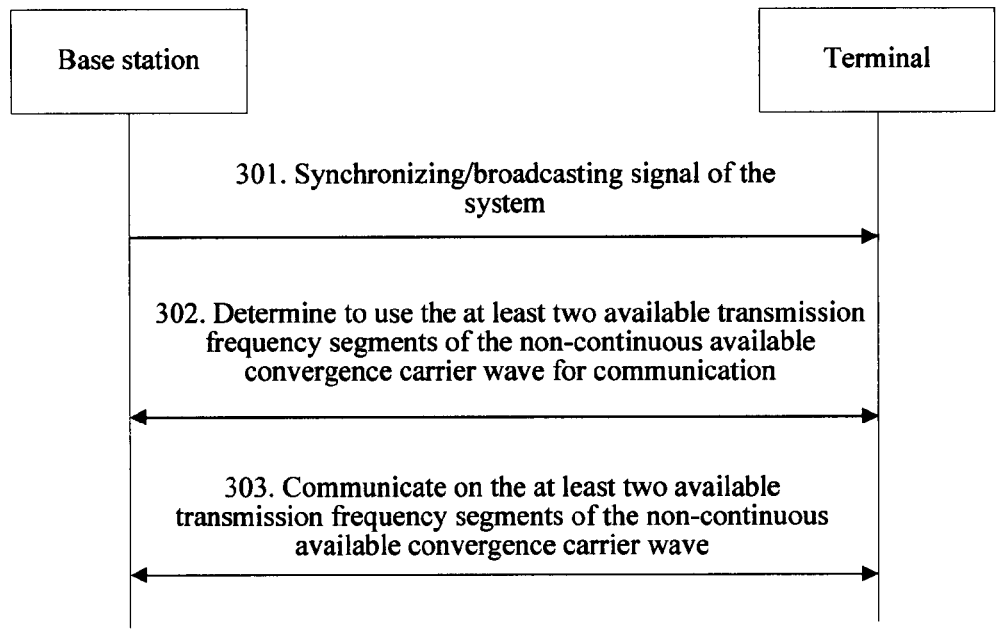
FIG. 3 is a schematic flow chart of a method for communicating by using a convergence carrier wave according to Embodiment 2 of the present invention.

For the convenience of understanding, a process that a base station communicates with a terminal by using a non-continuous available convergence carrier wave is taken as an example for detailed illustration. Referring to FIG. 3, a method for communicating by using a convergence carrier wave according to Embodiment 2 of the present invention may include.

301: A base station schedules a synchronizing/broadcasting signal of a system onto one available transmission frequency segment of a non-continuous available convergence carrier wave to transmit the synchronizing/broadcasting signal to a terminal.

The non-continuous available convergence carrier wave generally includes at least two available frequency segments, and at least one unavailable frequency segment. it is generally required that a bandwidth of the non-continuous available convergence carrier wave is smaller than or equal to the maximum working bandwidth of the system. A case that the bandwidth of the non-continuous available convergence carrier wave is equal to the maximum working bandwidth of the system is taken below as an example for detailed illustration.

Figure 4:
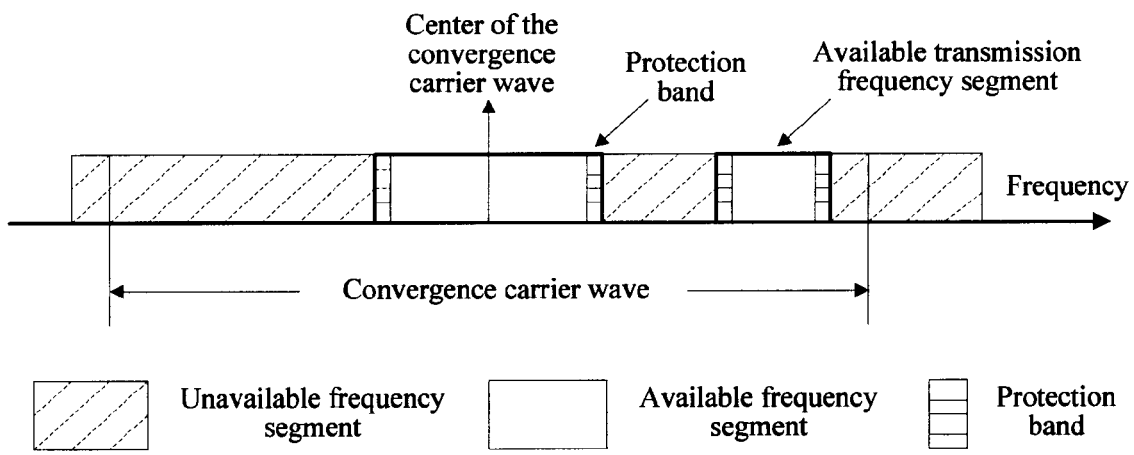
FIG. 4 is a schematic structure diagram of a convergence carrier wave according to Embodiment 2 of the present invention.

As shown in FIG. 4, the available frequency segment of the non-continuous convergence carrier wave generally includes a protection band part and an available transmission frequency segment part. A protection band of the available frequency segment is usually distributed at two sides of an available transmission frequency segment of the available frequency segment, and a bandwidth of the protection band may be determined according to an actual condition. The protection band of the available frequency segment and the unavailable frequency segment both are unavailable transmission frequency segments, and are not used for data transmission generally. Particularly, if the protection band does not need to be set, the entire available frequency segment may be referred to as an available transmission frequency segment, and can be used for data transmission.

A bandwidth of the at least one available frequency segment (the available transmission frequency segment plus the protection band) of the non-continuous available convergence carrier wave may be greater than, or equal to or close to the minimum working bandwidth of the system, and a bandwidth of other available frequency segment may be greater than or equal to the minimum working bandwidth of the system, or may be smaller than or equal to the minimum working bandwidth of the system.

The base station may select any available frequency segment with a bandwidth greater than, or equal to or close to the minimum working bandwidth of the system of the non-continuous convergence carrier wave, and schedule the synchronizing/broadcasting signal of the system onto the selected available transmission frequency segment to transmit the synchronizing/broadcasting signal to the terminal.

In the following, a case that the base station schedules the synchronizing/broadcasting signal of the system onto an available transmission frequency segment where a central frequency of the non-continuous available convergence carrier wave is located to transmit the synchronizing/broadcasting signal to the terminal is taken as an example for detailed illustration.

At this time, a continuous available frequency segment bandwidth of the available frequency segment where the central frequency of the non-continuous available convergence carrier wave is located is greater than, or equal to or close to the minimum working bandwidth of the system. Optimally, the continuous available frequency segment bandwidth of the available frequency segment where the central frequency of the non-continuous available convergence carrier wave is located is greater than or equal to the minimum working bandwidth.

The central frequency of the convergence carrier wave is a center of a convergence carrier wave frequency spectrum. When carrier waves are converged, it is generally required that a frequency segment where the central frequency of the convergence carrier wave is located is the available transmission frequency segment of the system. Considering reliability and compatibility, in an application scenario, the center of the whole convergence carrier wave frequency spectrum is also a center of a frequency spectrum of the available transmission frequency segment where the central frequency of the convergence carrier wave is located.

The base station may schedule the synchronizing/broadcasting signal of the system onto partial or all available transmission frequency segments near the central frequency of the non-continuous available convergence carrier wave to transmit the synchronizing/broadcasting signal to a terminal. A bandwidth occupied by transmission of the synchronizing/broadcasting signal may be determined according to a specific application scenario.

The synchronizing signal is mainly used to assist the terminal to implement synchronization with the system. If the base station uses the available transmission frequency segment where the central frequency of the non-continuous available convergence carrier wave is located to transmit the synchronizing/broadcasting signal to the terminal, the terminal may receive the synchronizing signal and the broadcasting signal by searching a synchronization channel, synchronize with the system, and obtain the central frequency of the non-continuous available convergence carrier wave.

In an application scenario, the broadcasting signal may carry bandwidth information, where the carried bandwidth information may indicate the bandwidth of the available transmission frequency segment where the central frequency of the non-continuous available convergence carrier wave is located. The terminal may learn the bandwidth of the available transmission frequency segment where the central frequency of the non-continuous available convergence carrier wave is located by receiving the broadcasting signal, thereby determining a frequency spectrum range of the available transmission frequency segment where the central frequency of the non-continuous available convergence carrier wave is located.

It can be seen that, since the base station only selects one available transmission frequency segment of the convergence carrier wave to transmit the synchronizing/broadcasting signal, only one set of base band processing unit needs to be configured on the base station to process data for communication using the whole convergence carrier wave, which greatly decreases the complexity of data processing.

302: The base station determines to use the at least two available transmission frequency segments of the non-continuous available convergence carrier wave to communicate with the terminal.

Further, before determining to use the at least two available transmission frequency segments of the non-continuous available convergence carrier wave to communicate with the terminal, the base station may communicate with the terminal on the available transmission frequency segment that is used for transmitting the synchronizing/broadcasting signal of the system, namely the available transmission frequency segment where the central frequency of the non-continuous available convergence carrier wave is located.

For example, before the base station determines to use the at least two available transmission frequency segments of the non-continuous available convergence carrier wave to communicate with the terminal, the base station may assign a downlink transmission resource for L1/L2 control signaling of the system on the available transmission frequency segment where the central frequency of the non-continuous available convergence carrier wave is located, and schedule the L1/L2 control signaling of the system onto the assigned downlink transmission resource to transmit the L1/L2 control signaling to the terminal. The terminal may receive the L1/L2 control signaling of the system to learn related information in the determined frequency spectrum range of the available transmission frequency segment where the central frequency of the non-continuous available convergence carrier wave is located.

The base station may use multiple manners to determine whether to use the at least two available transmission frequency segments of the non-continuous available convergence carrier wave to communicate with the terminal.

In an application scenario, the determining manner of the base station may be: the base station sends a startup message to the terminal, where the startup message carries indication information indicating that the base station is going to use the at least two available transmission frequency segments of the non-continuous available convergence carrier wave to communicate with the terminal.

A major usage of the startup message is to notify the terminal of a situation that the base station is going to use the at least two available transmission frequency segments of the non-continuous available convergence carrier wave to communicate with the terminal. By receiving the startup message, the terminal learns that the base station is going to use the at least two available transmission frequency segments of the non-continuous available convergence carrier wave to communicate with the terminal, and prepares for the communication.

The startup message may further include: start time when the base station uses the at least two available transmission frequency segments of the non-continuous available convergence carrier wave to communicate with the terminal. The start time may be the time of a next frame or next sub-frame following a radio frame or radio sub-frame carrying the startup message, or the time after multiple radio frames or multiple sub-frames.

The indication information carried in the startup message may be any type of information capable of notifying the terminal that the base station is going to use the at least two available transmission frequency segments of the non-continuous available convergence carrier wave to communicate with the terminal. For example, in an application scenario, a type of the startup message may be L1/L2 control signaling of the system, or upper layer control signaling of the system. The base station may assign transmission resources on the available transmission frequency segment bearing and transmitting the synchronizing/broadcasting signal of the system, so as to transmit the startup message.

In an application scenario, the indication information carried in the startup message may include one or more pieces of the following information: bandwidth information of the non-continuous available convergence carrier wave, frequency spectrum information of the at least two available transmission frequency segments of the non-continuous available convergence carrier wave, a startup indication signal of 1 bit or several bits, which is not limited herein.

The frequency spectrum information of the at least two available transmission frequency segments of the non-continuous available convergence carrier wave may be available transmission frequency segment style information of the non-continuous available convergence carrier wave. The available transmission frequency segment style is mainly used to indicate: which frequency segments in the non-continuous available convergence carrier wave are available transmission frequency segments (which can be used for data transmission), and which frequency segments are unavailable transmission frequency segments (which cannot be used for data transmission).

The process of determining to use the at least two available transmission frequency segments of the non-continuous available convergence carrier wave for communication may further include the following.

After correctly receiving the startup message, the terminal sends a startup acknowledgment message to the base station, where the startup acknowledgment message may carry an acknowledgment signal that the terminal accepts the using all available transmission frequency segments of the non-continuous available convergence carrier wave for communication, and/or start time information of using the at least two available transmission frequency segments of the non-continuous available convergence carrier wave for communication. The base station receives the startup acknowledgment message and learns related information carried in the startup acknowledgment message, thereby determining that the at least two available transmission frequency segments of the non-continuous available convergence carrier wave may be used to communicate with the terminal.

303: The base station communicates with the terminal on the at least two available transmission frequency segments of the non-continuous available convergence carrier wave.

The base station may assign the downlink transmission resource for downlink data of the terminal on the at least two available transmission frequency segments of the non-continuous available convergence carrier wave, notify the terminal of a position of the downlink transmission resource assigned for the downlink data of the terminal, and schedule the downlink data of the terminal onto the assigned downlink transmission resource to transmit the downlink data to the terminal.

Although the base station communicates with the terminal on the at least two available transmission frequency segments of the non-continuous available convergence carrier wave, the base station may communicate with the terminal without using all of the at least two available transmission frequency segments; instead, the base station may communicate with the terminal by selectively using partial or all of available transmission frequency segments of the at least two available transmission frequency segments of the non-continuous available convergence carrier wave according to a communication data volume, a channel state and a terminal capability.

The downlink data of the terminal may include one or more types of the following data: service data, L1/L2 control signaling of the system, and upper layer control signaling of the system.

Transmission resource (such as the uplink transmission resource and downlink transmission resource) usually has a frequency dimension and a time dimension, that is, the transmission resource usually refers to occupying a certain time period of a certain frequency segment, and a position of the transmission resource may refer to a certain time period of a certain frequency segment.

The base station may transmit the L1/L2 control signaling of the system to the terminal by only using the available transmission frequency segment where the central frequency of the non-continuous available convergence carrier wave is located, that is to say, the base station assigns the downlink transmission resource for the L1/L2 control signaling of the system only on the available transmission frequency segment where the central frequency of the non-continuous available convergence carrier wave is located, and uses the at least two available transmission frequency segments of the non-continuous available convergence carrier wave to transmit the service data and upper layer control signaling of the system to the terminal.

Definitely, the base station may assign the uplink transmission resource for uplink data of the terminal on the at least two available transmission frequency segments of the non-continuous available convergence carrier wave, notify the terminal of a position of the uplink transmission resource assigned for the uplink data of the terminal, and receive the uplink data, which is sent by the terminal, at the position of the assigned uplink transmission resource.

The position of the transmission resource may be carried in resource scheduling information. The base station may notify the terminal of the position of the uplink transmission resource and/or the downlink transmission resource in multiple manners. In an application scenario, the base station may use the L1/L2 control signaling of the system, or the upper layer control signaling of the system to send the resource scheduling information to the terminal. The terminal may learn the position of the uplink transmission resource and/or the downlink transmission resource by receiving the L1/L2 control signaling of the system or the upper layer control signaling of the system carrying the resource scheduling information, and may send the uplink data to the base station at the position of the uplink transmission resource and/or receive the downlink data sent by the base station at the position of the downlink transmission resource.

On the available transmission frequency segment for transmitting the synchronizing/broadcasting signal, the base station may transmit the synchronizing/broadcasting signal, service data, L1/L2 control signaling of the system and upper layer control signaling of the system through Time Division Multiplexing (TDM), Code Division Multiplexing (CDM) or other multiplexing manners, so as to fully utilize frequency spectrum resources.

Further, during a process that the base station communicates with the terminal by using the at least two available transmission frequency segments of the convergence carrier wave, the base station may further send a termination message to the terminal, and the terminal may also send a termination message to the base station, where the termination message may carry termination time information.

After receiving or sending the termination message, the base station terminates to use the at least two available transmission frequency segments of the convergence carrier wave to communicate with the terminal. After terminating to use the at least two available transmission frequency segments of the convergence carrier wave to communicate with the terminal, the base station may communicate with the terminal only on the first available transmission frequency segment of the convergence carrier wave.

The steps do not have a definite successive order. The steps may be executed at the same time, or executed in an interleaved manner.

For better understanding of the technical solutions according to the embodiment of the present invention, implementation of the technical solutions in an LTE system is taken as an example for further detailed descriptions.

The minimum working bandwidth of an LTE system is 1.4 MHz, and the maximum working bandwidth of the LTE system is 20 MHz. Therefore, a bandwidth of a non-continuous available convergence carrier wave is required to be smaller than or equal to 20 MHz. A case that the bandwidth of the non-continuous available convergence carrier wave is equal to 20 MHz is taken as an example for detailed illustration.

Figure 5:
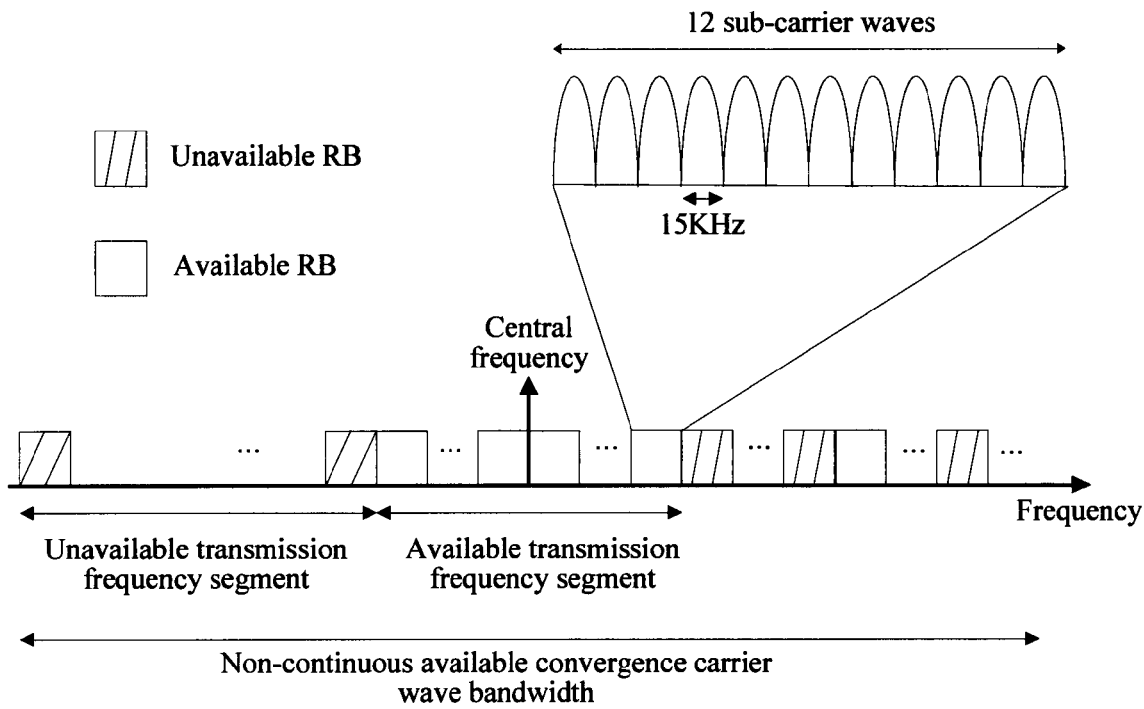
FIG. 5 is a schematic structure diagram of another convergence carrier wave according to Embodiment 2 of the present invention.

As shown in FIG. 5, a frequency segment of 20 MHz of the non-continuous available convergence carrier wave may be divided into multiple Resource Blocks (RBs) according to a manner defined in an LTE standard, and each RB may include 12 continuous sub-carrier waves. An interval between every two sub-carrier waves may be 15 KHz. An RB that partially or all includes unavailable transmission frequency segments is regarded as an unavailable RB. Division of 100 RBs is taken as an example below for detailed illustration.

Further, all continuous RBs except 6 RBs of a central frequency of the non-continuous available convergence carrier wave may be divided into multiple sub-bands, and all RBs in a sub-band that includes an unavailable RB are regarded as unavailable RBs. In particular, 100 RBs may also be divided into 100 sub-bands, and each RB is a sub-band.

1: A base station may schedule a synchronizing/broadcasting signal of a system onto 6 RBs of a central frequency of a non-continuous available convergence carrier wave to transmit the synchronizing/broadcasting signal to a terminal.

In consideration of compatibility, the synchronizing/broadcasting signal may be transmitted to the terminal in a manner described in a $3^{rd}$ Generation Partnership Project (3GPP) LTE 36 protocol. The broadcasting signal may carry bandwidth information, where the carried bandwidth information carried may indicate the number of the available RBs of the available transmission frequency segment where the central frequency of the non-continuous available convergence carrier wave is located.

An LTE system specifies the number that is of the RBs and is indicated by the bandwidth information carried in the broadcasting signal, namely a number in a set {6, 15, 25, 50, 75, 100}. Further in consideration of compatibility, the number that is of the RBs and is indicated by the bandwidth information carried in the broadcasting signal is the maximum value that is in the set {6, 15, 25, 50, 75, 100} and is smaller than or equal to the number of the available RBs of the available transmission frequency segment where the central frequency of the non-continuous available convergence carrier wave is located.

For example, if the number of the available RBs of the available transmission frequency segment where the central frequency of the non-continuous available convergence carrier wave is located is N, the number that is of the RBs and is indicated by the bandwidth information carried in the broadcasting message is the maximum number M that is in the set {6, 15, 25, 50, 75, 100} and is smaller than or equal to N. Definitely, M is smaller than or equal to N. For example, if N=70, then M=50, and the number that is of the available RBs and is indicated by the bandwidth information carried in the broadcasting message is 50.

By searching a synchronization channel, the terminal receives the synchronizing signal, synchronizes to the system, and obtains the central frequency of the non-continuous available convergence carrier wave. The terminal receives the broadcasting signal on continuous available frequency segments near the central frequency of the non-continuous available convergence carrier wave, and learns the bandwidth of the continuous available transmission frequency segment where the central frequency of the non-continuous available convergence carrier wave is located, namely a bandwidth corresponding to M RBs.

2: The base station and the terminal determine to use all available transmission frequency segments of the non-continuous available convergence carrier wave to communicate with each other.

A first determining manner of the base station may be that, the base station uses the upper layer control signaling or layer 1/layer 2 control signaling of the system to notify the terminal that the base station is going to use all available transmission frequency segments of the non-continuous available convergence carrier wave to perform data transceiving with the terminal. After receiving an acknowledgment signal fed back by the terminal, the base station determines that all available transmission frequency segments of the non-continuous available convergence carrier wave may be used for communication. The acknowledgment signal is sent by the terminal after the terminal learns and accepts that the base station is going to use all available transmission frequency segments of the non-continuous available convergence carrier wave to perform data transceiving.

Definitely, after using the upper layer control signaling or the layer 1/layer 2 control signaling of the system to notify the terminal, the base station may also regard by default that the terminal has learned and accepted that the base station is going to use all available transmission frequency segments of the non-continuous available convergence carrier wave to perform data transceiving with the terminal, thereby determining that all available transmission frequency segments of the non-continuous available convergence carrier wave may be used for communication.

A second determining method of the base station may be that, the base station notifies the terminal of available transmission frequency segment style information of the non-continuous available convergence carrier wave. After receiving the available transmission frequency segment style information of the non-continuous available convergence carrier wave, the terminal regards by default that the base station is going to use all available transmission frequency segments of the non-continuous available convergence carrier wave to perform data transceiving with the terminal. The terminal feeds back to the base station an acknowledgment signal of correctly receiving the style information and accepting the using all available transmission frequency segments of the non-continuous available convergence carrier wave for data transceiving. After receiving the acknowledgment signal fed back by the terminal, the base station determines that all available transmission frequency segments of the non-continuous available convergence carrier wave may be used for communication.

Here, the available transmission frequency segment style information refers to: which RBs may be used to communicate with the terminal, and which RBs may not be used to communicate with the terminal.

Definitely, after notifying the available transmission frequency segment style information of the non-continuous available convergence carrier wave to the terminal, the base station may also regard by default that the terminal has learned and accepted that the base station is going to use all available transmission frequency segments of the non-continuous available convergence carrier wave to perform data transceiving with the terminal, thereby determining that all available transmission frequency segments of the non-continuous available convergence carrier wave may be used for communication.

The available transmission frequency segment style information of the non-continuous available convergence carrier wave may adopt multiple data formats. For example, in an application scenario, according to a sub-band division situation, indication information of 1 bit may be used to respectively indicate whether the RB in each sub-band is available. For example, 1 represents that all RBs in the sub-band are available, and 0 represents that all RBs in the sub-band are unavailable. In order to further reduce redundancy of information transmission, the indication information indicating whether the 6 RBs where the central frequency is located are available may not be transmitted (the 6 RBs are always available).

After receiving the available transmission frequency segment style information of the non-continuous available convergence carrier wave, the terminal may determine position distribution of the RBs in the non-continuous available convergence carrier wave.

A third determining method of the base station may be that, the base station carries the total number of the RBs of the non-continuous available convergence carrier wave in the upper layer control signaling of the system and sends the upper layer control signaling to the terminal. After receiving the upper layer control signaling that is of the system and carries the total number of the RBs, the terminal regards by default that the base station is going to use all available transmission frequency segments of the non-continuous available convergence carrier wave to perform data transceiving with the terminal. If the carried total number of the RBs is 50, the terminal may regard that a bandwidth of the non-continuous available convergence carrier wave is 10 MHz. Further, by default, the terminal regards that the total number of the RBs is 100, and the bandwidth of the non-continuous available convergence carrier wave is 20 MHz. The terminal feeds back an acknowledgment signal of correctly receiving the upper layer control signaling of the system and accepting the using all available transmission frequency segments of the non-continuous available convergence carrier wave for data transceiving. After receiving the acknowledgment signal fed back by the terminal, the base station determines that all available transmission frequency segments of the non-continuous available convergence carrier wave may be used for communication.

Definitely, after sending the upper layer control signaling of the system carrying the total number of the RBs to the terminal, the base station may also regard by default that the terminal has learned and accepted that the base station is going to use all available transmission frequency segments of the non-continuous available convergence carrier wave to perform data transceiving with the terminal, thereby determining that all available transmission frequency segments of the non-continuous available convergence carrier wave may be used for communication.

A fourth determining method of the base station may be that, the base station carries the total number of the RBs and the available transmission frequency segment style information of the non-continuous available convergence carrier wave in the upper layer control signaling of the system at the same time, and sends the upper layer control signaling to the terminal. After receiving the upper layer control signaling that is of the system and carries the total number of the RBs and the available transmission frequency segment style information of the non-continuous available convergence carrier wave, the terminal regards by default that the base station is going to use all available transmission frequency segments of the non-continuous available convergence carrier wave to perform data transceiving with the terminal. The terminal feeds back to the base station an acknowledgment signal of correctly receiving the upper layer control signaling of the system and accepting the using all available transmission frequency segments of the non-continuous available convergence carrier wave for data transceiving. After receiving the acknowledgment signal fed back by the terminal, the base station determines that all available transmission frequency segments of the non-continuous available convergence carrier wave may be used for communication.

Definitely, after sending to the terminal the upper layer control signaling that is of the system and carries the total number of the RBs and the available transmission frequency segment style information of the non-continuous available convergence carrier wave, the base station may also regard by default that the terminal has learned and accepted that the base station is going to use all available transmission frequency segments of the non-continuous available convergence carrier wave to perform data transceiving with the terminal, thereby determining that all available transmission frequency segments of the non-continuous available convergence carrier wave may be used for communication.

The base station may also notify the terminal of start time of using all available transmission frequency segments of the non-continuous available convergence carrier wave for communication. The start time may be time of a next frame following a radio frame or a sub-frame of the radio frame through which the base station sends the acknowledgment signal, or time after multiple radio frames or sub-frames thereof.

The terminal may also negotiate with the base station the start time of using all available transmission frequency segments of the non-continuous available convergence carrier wave for communication. In an application scenario, the terminal may send a startup acknowledgment message to the base station, where the startup acknowledgment message may carry start time information of using all available transmission frequency segments of the non-continuous available convergence carrier wave for communication, and may further carry an acknowledgment signal of accepting that all available transmission frequency segments of the non-continuous available convergence carrier wave are used to perform data transceiving with the terminal.

The base station and the terminal may also appoint start time in advance, for example, preset that using all available transmission RBs of the non-continuous convergence carrier wave for communication is started at a next frame or next sub-frame following a frame or sub-frame bearing the startup message. At this time, during a determining process, the base station and the terminal do not need to negotiate the start time of using all available transmission RBs of the non-continuous convergence carrier wave for communication.

Messages during the determining process may be borne by the L1/L2 control signaling, or the upper layer control signaling.

3: The base station communicates with the terminal on all available transmission frequency segments of the non-continuous available convergence carrier wave.

The communication process may include that the base station sends downlink data to the terminal, and the terminal sends uplink data to the base station. Specifically, if the base station needs to transmit the downlink data to the terminal, the base station may assign downlink transmission resource for the terminal on all available transmission frequency segments of the non-continuous available convergence carrier wave, where the assigned downlink transmission resource is partial or all available RBs on all available transmission frequency segments of the non-continuous available convergence carrier wave; carry downlink resource scheduling information indicating a position of the downlink transmission resource in the L1/L2 control signaling of the system to send the L1/L2 control signaling to the terminal; and schedule the downlink data of the terminal onto the assigned transmission resource to send the downlink data to the terminal.

In another aspect, if the base station needs the terminal to transmit the uplink data, the base station may assign uplink transmission resource for the uplink data of the terminal on all available transmission frequency segments of the non-continuous available convergence carrier wave, where the assigned uplink transmission resource is partial or all available RBs on all available transmission frequency segments of the non-continuous available convergence carrier wave; carry uplink resource scheduling information indicating a position of the uplink transmission resource in the L1/L2 control signaling of the system to send the L1/L2 control signaling to the terminal; and receive the uplink data, which is sent by the terminal, at the position of the uplink transmission resource of the terminal.

In 3GPP LTE, a unit of resource scheduling and transmission is a Transport Block.

In an application scenario, before the base station and the terminal determine to use all available transmission RBs of the non-continuous available convergence carrier wave to communicate with each other, the base station may communicate with the terminal only on the transmission resource corresponding to the M RBs (including uplink data and/or downlink data communication). Each message during the process that the base station and the terminal determine to use all available transmission RBs of the non-continuous available convergence carrier wave to communicate with each other may be borne by partial or all resources in the M RBs.

In an application scenario, the L1/L2 control signaling of the system may be borne by a Physical Control Format Indicator Channel (PCFICH), a Physical Downlink Control Channel (PDCCH), a Physical Hybrid-ARQ Indicator Channel (PHICH) and a Physical Uplink Control Channel (PUCCH) for transmission. The scheduling and transmission method of the L1/L2 control signaling may use a manner specified by the LTE standard.

Before the base station and the terminal determine to use all available transmission frequency segments of the non-continuous available convergence carrier wave to communicate with each other, the terminal receives and parses data, which is borne by the PCFICH, in a bandwidth range of the M RBs of the continuous available transmission frequency segment where the central frequency of the non-continuous available convergence carrier wave is located, obtains a symbol number of a transmission PDCCH, and further parses data borne by the PDCCH to obtain the L1/L2 control signaling of the system.

After the base station starts using all available transmission RBs of the non-continuous available convergence carrier wave to communicate with the terminal, the L1/L2 control signaling of the system may be borne by the bandwidth of the continuous available transmission frequency segment where the central frequency of the non-continuous available convergence carrier wave is located, namely the M RBs, or may be borne by all available transmission RBs of the non-continuous available convergence carrier wave.

An uplink Sounding signal may be transmitted merely through the continuous available transmission frequency segment where the central frequency of the non-continuous available convergence carrier wave is located, namely the M RBs, or may be transmitted through all available transmission RBs of the non-continuous available convergence carrier wave.

After the base station starts using all available transmission frequency segments of the non-continuous available convergence carrier wave to communicate with the terminal, the base station may assign the transmission resource for the uplink data and downlink data of the terminal on all available transmission frequency segments of the non-continuous available convergence carrier wave, and use all available transmission frequency segments of the non-continuous available convergence carrier wave to communicate with the terminal.

In an application scenario, after the base station starts using all available transmission frequency segments of the non-continuous available convergence carrier wave to communicate with the terminal, the base station may schedule Physical Downlink Shared Channel (PDSCH) data onto all available transmission RBs of the non-continuous available convergence carrier wave for transmission, and/or schedule Physical Uplink Shared Channel (PUSCH) data onto all uplink or downlink available RBs of the non-continuous available convergence carrier wave for transmission.

In an application scenario, an uplink and a downlink of the base station and the terminal may adopt different available transmission RBs. For example, the base station may use all available transmission frequency segments of the non-continuous available convergence carrier wave to transmit the downlink data to the terminal. However, the base station assigns the uplink transmission resource for the uplink data of the terminal only on the determined M RBs, and the terminal uses the uplink transmission resource assigned by the base station to transmit the uplink data to the base station. By default, total communication resources of the base station and total communication resources of the terminal are equal, that is, both the base station and the terminal may use all available transmission frequency segments of the non-continuous available convergence carrier wave for data transmission. If uplink transmission of the terminal and downlink transmission of the base station use different convergence carrier waves, the base station may notify the terminal through control signaling of the system.

In an application scenario, the base station first sets the unavailable RBs to RBs that are not assigned to the terminal, and then uses an LTE compatible manner to perform scheduling of transmission resources and perform transmission of corresponding scheduling information. Downlink resource scheduling manners are taken as an example below. In an application scenario, the base station may adopt the following three types of the downlink resource scheduling manners, namely, type 0, type 1, and type 2.

In type 0, the RBs are divided into multiple Resource Block Groups (RBGs), and each RBG includes four continuous RBs. In the four continuous RBs included in the RBG, if one RB is an unavailable RB, the entire RBG is served as an unavailable RBC, and a bit number 0 may be used to indicate that the RBG is unavailable. The terminal may receive the downlink data at an RBG corresponding to a bit number 1.

In type 1, a $p^{th}$ (0=<p<P, P=4) RB is taken out from each RBG to form a set. It is assumed that the set includes X RBs, and X bits are used to respectively represent whether the RBs in the set are available. A bit value corresponding to an available RB is 1, indicating that the RB is available; a bit value corresponding to an unavailable RB is 0, indicating that the RB is unavailable. The terminal may receive the data at an RB corresponding to the bit number 1.

Type 2 is mainly used for assigning and scheduling continuous resources. Type 2 is further divided into two types, one is Localized Virtual Resource Blocks, and the other is Distributed Virtual Resource Blocks.

In the Localized Virtual Resource Blocks, a start position of a local resource and a length of the resource are used to indicate a resource that is to be scheduled. In scheduling, the scheduled and indicated resource only includes available RBs, and does not include unavailable RBs.

In Distributed Virtual Resource Blocks, resource scheduling is continuous on virtual RBs. First, a mapping relationship between physical available RBs and the virtual RBs is established, and the mapping relationship is notified to the terminal. Physical resources corresponding to continuous virtual resources that are assigned in the resource scheduling and transmission are all available RBs.

In an application scenario, the system (the base station and the terminal) first maps all available transmission RBs of the non-continuous available convergence carrier wave to level 1 virtual continuous RBs, and maps all downlink available transmission RBs of the non-continuous available convergence carrier wave to level 1 downlink virtual continuous RBs, and/or maps all uplink available transmission RBs of the non-continuous available convergence carrier wave to level 1 uplink virtual continuous RBs, and then uses the LTE compatible manner to perform scheduling of transmission resources for the level 1 virtual continuous RBs, perform transmission of the corresponding scheduling information and perform data transmission on the corresponding scheduled transmission resources.

Downlink resource scheduling is taken as an example in the following. The base station maps all available transmission RBs of the non-continuous available convergence carrier wave to level 1 virtual continuous RBs. Mapping may be performed in multiple manners. In one manner, a first level 1 virtual RB corresponds to a first available transmission RB; a second level 1 virtual RB corresponds to a second available transmission RB, and the rest may be deduced by analogy. After mapping, the base station may use the three types of downlink resource scheduling manners to perform the scheduling of the transmission resources, perform transmission of the corresponding scheduling information, and perform data transmission on the corresponding scheduled transmission resources. For example, in type 0, according to a size of the level 1 virtual RBs, the level 1 virtual RBs are divided into multiple RBGs. Each RBG includes one to four continuous level 1 virtual RBs. Downlink transmission may be scheduled onto one or more specific RBGs, and 1 bit of information is used in each RBG to notify the terminal whether to receive the downlink data at the RBG. After receiving resource scheduling information, the terminal determines, according to the resource scheduling information, the RBG where the data is received, and then determines, according to the mapping relationship between all available transmission RBs of the non-continuous available convergence carrier wave and the level 1 virtual continuous RBs, transmission RBs that are of the non-continuous available convergence carrier wave and are corresponding to the RBG where the data is received, thereby obtaining the downlink data, which the base station transmits to the terminal, from the transmission RBs of the non-continuous available convergence carrier wave.

In this application scenario, the base station needs to notify the available transmission frequency segment style information of the non-continuous available convergence carrier wave to the terminal, that is to say, the base station notifies the terminal of the available transmission RBs and the unavailable transmission RBs within the bandwidth of the non-continuous available convergence carrier wave. The base station and the terminal may appoint in advance the mapping relationship between all available transmission RBs of the non-continuous available convergence carrier wave and the level 1 virtual continuous RBs.

In this application scenario, when transmitting the resource scheduling information, the base station and the terminal may use the number of the level 1 virtual continuous RBs to serve as the maximum value of resource scheduling, and the corresponding transmission bit number of the resource scheduling information is also calculated according to the number of the level 1 virtual continuous RBs. In this application scenario, after receiving the scheduling information, the terminal may determine, according to the appointed mapping relationship, an actual physical RB that is to be actually received or transmitted, and the terminal receives or sends data at a corresponding physical resource position.

Further, during a process that the base station and the terminal use all available transmission frequency segments of the non-continuous available convergence carrier wave to communicate with each other, the base station or the terminal may further send a termination message to each other to terminate to use the at least two available transmission frequency segments of the convergence carrier wave for communication. After termination, the base station and the terminal only use the available transmission frequency segment of the synchronizing/broadcasting signal of the transmission system to communicate with each other. The termination message may carry termination time information. The base station and the terminal terminate to use all available transmission frequency segments of the non-continuous available convergence carrier wave for communication at the termination time. After that, if communication is required, the base station and the terminal only use the available transmission frequency segment where the synchronizing/broadcasting signal of the system is located for communication.

Further, the base station may further judge a capability of the terminal. For a part of terminals with a low capability such as a terminal that does not support the non-continuous convergence carrier wave, the base station may communicate with the terminal only on the transmission resource corresponding to the determined M RBs (uplink and downlink data communication). For a terminal supporting the non-continuous convergence carrier wave, the base station may use all available transmission frequency segments of the non-continuous available convergence carrier wave to communicate with the terminal.

It can be understood that the manner of using the non-continuous available convergence carrier wave for communication may be applicable to a Frequency Division Duplex (FDD) mode and a Time Division Duplex (TDD) mode.

The implementation manner in the LTE system is merely an example. Definitely, other technical means capable of achieving same or similar technical effects may be partially or totally used during the implementation process. For implementation in other communication systems, corresponding modifications may be made to the implementation manner.

It can be seen from the technical solutions that, a convergence carrier wave including at least two available transmission frequency segments in the embodiment may work as a whole, so that the access network device may communicate with the terminal on the at least two available transmission frequency segments of the convergence carrier wave, and does not need to transmit the synchronizing/broadcasting signal in all available transmission frequency segments of the convergence carrier wave, therefore improving a frequency spectrum resource utilization ratio and decreasing complexity of data processing.

Further, the access network device and the terminal regard multiple non-continuous available frequency segments as one convergence carrier wave, and only one set of base band processing unit needs to be configured to implement data processing. Therefore the complexity of data processing is further decreased, compatibility with systems in the prior art is implemented, and an implementation cost is low.

Embodiment 4

Figure 6:
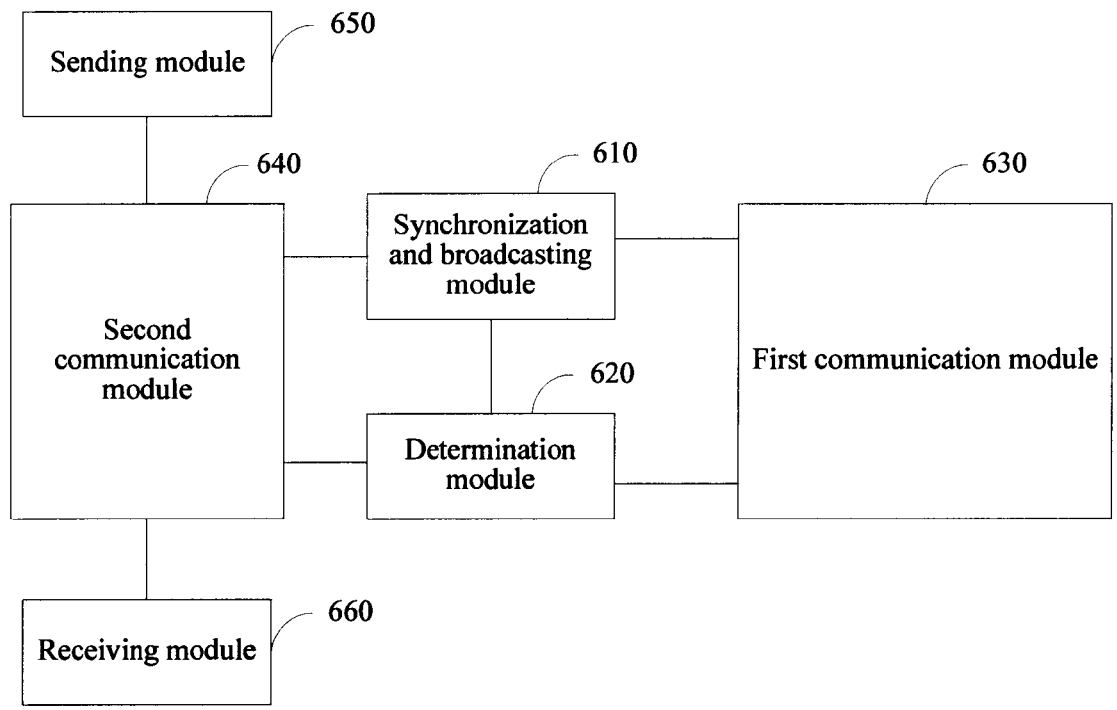
FIG. 6 is a schematic structure diagram of an access network device according to Embodiment 3 of the present invention.

Further, in order to better implement the technical solutions of the present invention, the embodiment of the present invention further provides an access network device. Referring to FIG. 6, an access network device according to Embodiment 3 of the present invention may include a synchronization and broadcasting module 610, a determination module 620 and a first communication module 630.

The synchronization and broadcasting module 610 is configured to schedule a synchronizing signal and a broadcasting signal of a system on a first available transmission frequency segment of a convergence carrier wave to transmit the synchronizing signal and the broadcasting signal to a terminal, where the convergence carrier wave includes at least two available transmission frequency segments, and a bandwidth of the convergence carrier wave is smaller than or equal to the maximum working bandwidth of the system.

The convergence carrier wave may either be a continuous available convergence carrier wave or a non-continuous available convergence carrier wave. The continuous available convergence carrier wave includes at least two continuous available transmission frequency segments, and the non-continuous available convergence carrier wave includes at least two non-continuous available transmission frequency segments. Definitely, the convergence carrier wave may further include one or more unavailable transmission frequency segments.

For a specific system, each frequency segment of the convergence carrier wave may be an available transmission frequency segment or an unavailable transmission frequency segment. For example, for a system A, a frequency segment 1 of the convergence carrier wave is an available transmission frequency segment, while for a system B, the frequency segment 1 may be an unavailable transmission frequency segment.

In an application scenario, the first available transmission frequency segment of the convergence carrier wave may be an available transmission frequency segment where a central frequency of the convergence carrier wave is located, or may be another available transmission frequency segment of the convergence carrier wave.

The determination module 620 is configured to determine to use the at least two available transmission frequency segments of the convergence carrier wave to communicate with the terminal.

The first communication module 630 is configured to communicate with the terminal on the at least two available transmission frequency segments of the convergence carrier wave.

In an application scenario, the first available transmission frequency segment of the convergence carrier wave may be an available transmission frequency segment where a central frequency of the convergence carrier wave is located.

The synchronization and broadcasting module 610 may be configured to schedule the synchronizing/broadcasting signal of the system onto the available transmission frequency segment where the central frequency of the convergence carrier wave is located to transmit the synchronizing/broadcasting signal to the terminal, where the broadcasting signal may further carry bandwidth information of the available transmission frequency segment where the central frequency of the convergence carrier wave is located.

The access network device may further include a second communication module 640, which is configured to communicate with the terminal on the available transmission frequency segment where the central frequency of the convergence carrier wave is located, before the determination module 620 determines to use the at least two available transmission frequency segments of the convergence carrier wave to communicate with the terminal.

In an application scenario, the determination module 620 may be further configured to send a startup message to the terminal, where the startup message carries indication information of using the at least two available transmission frequency segments of the convergence carrier wave to communicate with the terminal.

A major usage of the startup message sent by the determination module 620 is: notifying the terminal of a situation that the access network device is going to use the at least two available transmission frequency segments of the convergence carrier wave to communicate with the terminal. By receiving the startup message, the terminal learns that the access network device is going to use the at least two available transmission frequency segments of the convergence carrier wave to communicate with the terminal, and makes preparation for the communication.

Therefore, the indication information carried in the startup message may be any information capable of indicating to the terminal that the access network device is going to use the at least two available transmission frequency segments of the convergence carrier wave to communicate with the terminal.

In an application scenario, the indication information carried in the startup message may include one or more pieces of the following information: bandwidth information of the convergence carrier wave, frequency spectrum information of the at least two available transmission frequency segments of the convergence carrier wave, a startup indication signal of 1 bit or several bits, which is not limited herein.

For example, the first communication module 630 may assign transmission resources for uplink data and/or downlink data of the terminal on the at least two available transmission frequency segments of the convergence carrier wave, so as to send the downlink data to the terminal and/or receive the uplink data sent by the terminal.

The assigning the transmission resources for the uplink data and/or downlink data of the terminal on the at least two available transmission frequency segments of the convergence carrier wave refers to that, when resources are assigned, resources that may be considered are the at least two available transmission frequency segments of the convergence carrier wave. However, an actual resource scheduling result may be that the resources are merely partial or all resources in one available transmission frequency segment of the at least two available transmission frequency segments of the convergence carrier wave, or partial or all resources in multiple available transmission frequency segments.

The uplink data and downlink data of the terminal may include one or more types of the following data: service data, layer 1/layer 2 control signaling of the system, and upper layer control signaling of the system.

Figure 7A:
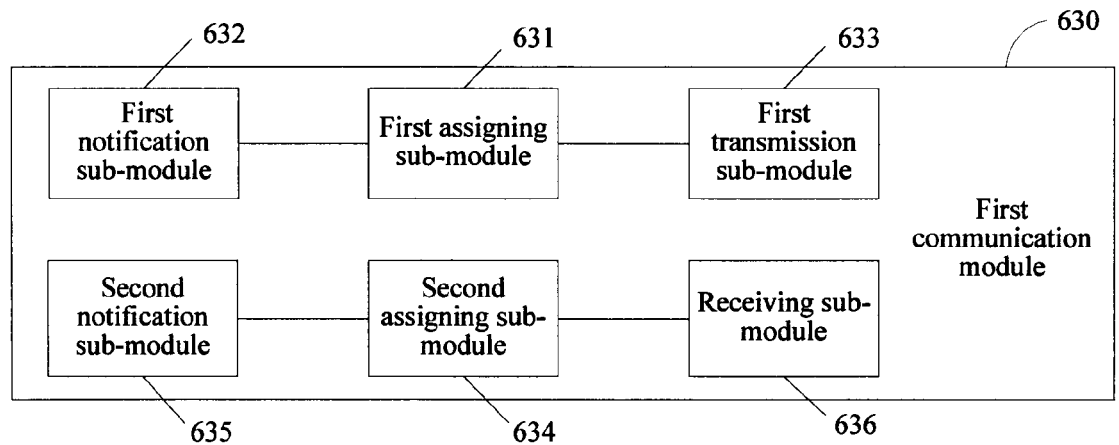
FIG. 7a is a schematic structure diagram of a first communication module according to Embodiment 3 of the present invention.

In an application scenario, as shown in FIG. 7a, the first communication module 630 may include a first assigning sub-module 631, a first notification sub-module 632, and a first transmission sub-module 633.

The first assigning sub-module 631 is configured to assign a downlink transmission resource for the downlink data of the terminal on the at least two available transmission frequency segments of the convergence carrier wave.

The first notification sub-module 632 is configured to notify the terminal of a position of the downlink transmission resource assigned by the first assigning sub-module 631 for the downlink data of the terminal.

The first transmission sub-module 633 is configured to schedule the downlink data of the terminal onto the assigned downlink transmission resource to transmit the downlink data to the terminal.

The first communication module 630 may further include a second assigning sub-module 634, a second notification sub-module 635, and a receiving sub-module 636.

The second assigning sub-module 634 is configured to assign an uplink transmission resource for the uplink data of the terminal on the at least two available transmission frequency segments of the convergence carrier wave.

The second notification sub-module 635 is configured to notify the terminal of a position of the uplink transmission resource assigned by the second assigning sub-module 634 for the uplink data of the terminal.

The receiving sub-module 636 is configured to receive the uplink data, which is sent by the terminal, at the position of the uplink transmission resource assigned by the second assigning sub-module 634.

Figure 7B:
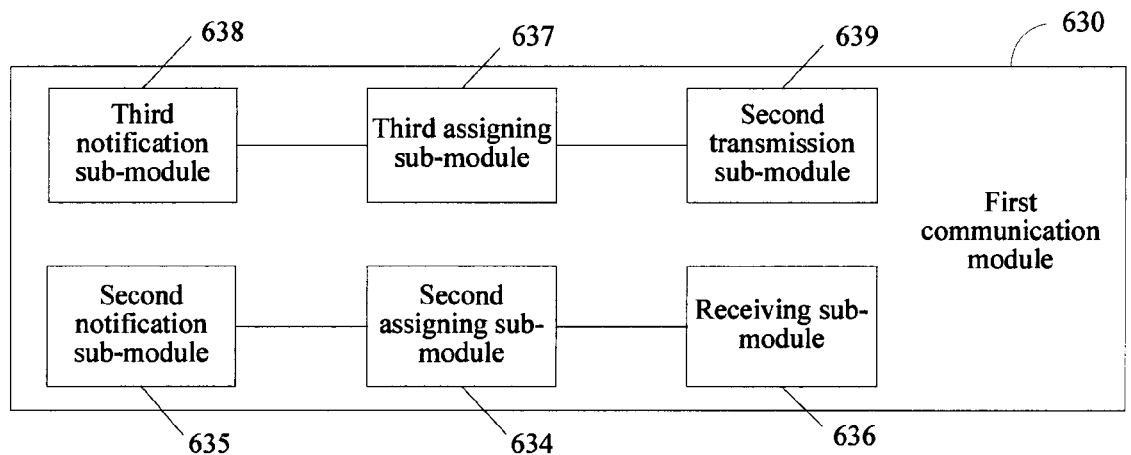
FIG. 7b is a schematic structure diagram of another first communication module according to Embodiment 3 of the present invention.

In another application scenario, as shown in FIG. 7b, the communication module 630 may include a third assigning sub-module 637, a third notification sub-module 638, and a second transmission sub-module 639.

The third assigning sub-module 637 is configured to assign the downlink transmission resource for service data and/or upper layer control signaling of the system on the at least two available transmission frequency segments of the convergence carrier wave, and assign the downlink transmission resource for layer 1/layer 2 control signaling of the system on the available transmission frequency segment where the central frequency of the convergence carrier wave is located.

The third notification sub-module 638 is configured to notify the terminal of the position of the downlink transmission resource assigned by the third assigning sub-module 637 for the service data, the layer 1/layer 2 control signaling of the system, and/or the upper layer control signaling of the system.

The second transmission sub-module 639 is configured to schedule the service data, the layer 1/layer 2 control signaling of the system, and/or the upper layer control signaling of the system onto the assigned downlink transmission resource to transmit the service data, the layer 1/layer 2 control signaling and/or the upper layer control signaling to the terminal.

The first communication module 630 may further include a second assigning sub-module 634, a second notification sub-module 635, and a receiving sub-module 636.

The second assigning sub-module 634 is configured to assign an uplink transmission resource for the uplink data of the terminal on the at least two available transmission frequency segments of the convergence carrier wave.

The second notification sub-module 635 is configured to notify the terminal of a position of the uplink transmission resource assigned by the second assigning sub-module 634 for the uplink data of the terminal.

The receiving sub-module 636 is configured to receive the uplink data, which is sent by the terminal, at the position of the uplink transmission resource assigned by the second assigning sub-module 634.

The determination module 620 is further configured to receive a startup acknowledgment message, where the startup acknowledgment message may carry start time information of using the at least two available transmission frequency segments of the convergence carrier wave to communicate with the terminal, and the startup acknowledgment message is sent by the terminal after the terminal receives the startup message.

The first communication module 630 may communicate with the terminal on the at least two available transmission frequency segments of the convergence carrier wave at the start time or after the start time.

The access network device may further include a sending module 650, configured to send a termination message to the terminal, where the termination message carries indication information of terminating to use the at least two available transmission frequency segments of the convergence carrier wave to communicate with the terminal.

After the sending module 650 sends the termination message, the second communication module 640 may communicate with the terminal on the available transmission frequency segment where the central frequency of the convergence carrier wave is located.

The access network device may further include a receiving module 660, configured to receive a termination message sent by the terminal, where the termination message carries indication information of terminating to use the at least two available transmission frequency segments of the convergence carrier wave for communication.

After the receiving module 660 receives the termination message, the second communication module 640 may communicate with the terminal on the available transmission frequency segment where the central frequency of the convergence carrier wave is located.

The access network device may be a base station, a base station controller, or other devices with similar functions in the communication system, which is not limited herein.

It can be seen from the technical solutions that, a convergence carrier wave including at least two available transmission frequency segments in the embodiment may work as a whole, so that the access network device may communicate with the terminal on the at least two available transmission frequency segments of the convergence carrier wave, and does not need to transmit the synchronizing signal/broadcasting signal in all available transmission frequency segments of the convergence carrier wave, therefore improving a frequency spectrum resource utilization ratio and decreasing complexity of data processing.

It can be understood that the access network device described in this embodiment may be the base station described in Embodiment 2, and functions of the function modules of the access network device may be implemented according to the method described in Embodiment 2. As for the specific implementation process, references may be made to relevant descriptions in Embodiment 2, and details are not described herein again.

Embodiment 4

Figure 8:
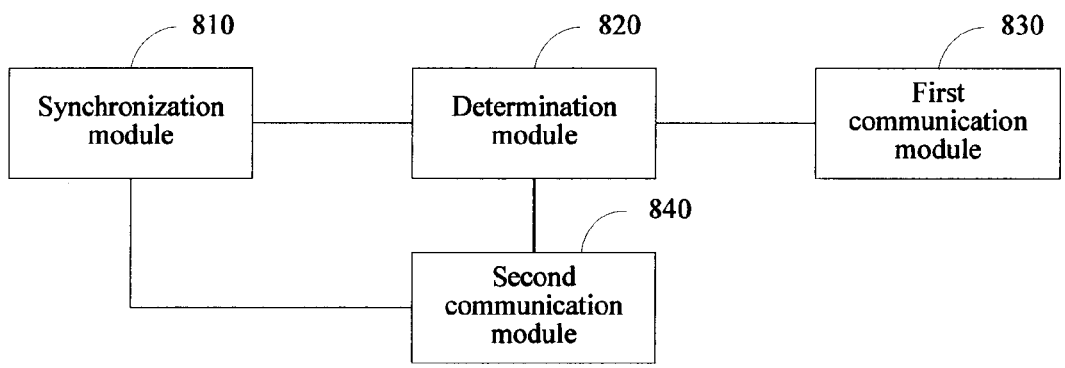
FIG. 8 is a schematic structure diagram of a terminal according to Embodiment 4 of the present invention.

Accordingly, the embodiment of the present invention further provides a terminal. As shown in FIG. 8, a terminal provided in Embodiment 4 of the present invention may include:

A synchronization module 810, which is configured to receive a synchronizing signal and a broadcasting signal sent by an access network device through a first available transmission frequency segment of a convergence carrier wave, and synchronize with the system.

A determination module 820, which is configured to determine to use at least two available transmission frequency segments of the convergence carrier wave to communicate with the access network device.

A first communication module 830, which is configured to communicate with the access network device on the at least two available transmission frequency segments of the convergence carrier wave.

In an application scenario, the first available transmission frequency segment of the convergence carrier wave may be an available transmission frequency segment where a central frequency of the convergence carrier wave is located, and the broadcasting signal may carry bandwidth information of the available transmission frequency segment where the central frequency of the convergence carrier wave is located.

The terminal may further include a second communication module 840, which is configured to communicate with the access network device on the available transmission frequency segment where the central frequency of the convergence carrier wave is located, before the determination module 820 determines to use the at least two available transmission frequency segments of the convergence carrier wave to communicate with the access network device.

In an application scenario, the determination module 820 may be configured to receive a startup message, where the startup message carries indication information that the access network device is going to use the at least two available transmission frequency segments of the convergence carrier wave for communication.

The determination module 820 is further configured to send a startup acknowledgment message to the access network device, where the startup acknowledgment message may carry start time information of using the at least two available transmission frequency segments of the convergence carrier wave for communication.

The terminal may be a cell phone, a PDA, a portable computer, or other devices with similar communication functions, which is not limited herein.

It can be understood that a user equipment of this embodiment may be the terminal described in Embodiment 2, and functions of the function modules of the user equipment may be implemented according to the method described in Embodiment 2. As for the specific implementation process, references may be made to relevant descriptions in Embodiment 2, and details are not described herein again.

Accordingly, the embodiment of the present invention further provides a communication system, where the communication system includes the access network device as described in Embodiment 3.

Embodiment 5

In view of a method for communicating by using a convergence carrier wave according to the embodiment of the present invention, the embodiment of the present invention further provides a carrier wave convergence method, where the method may be used to determine a convergence carrier wave.

The convergence carrier wave determined through the carrier wave convergence method may include at least two available frequency segments. Definitely, the determined convergence carrier wave may include one or more unavailable frequency segments.

Figure 9:
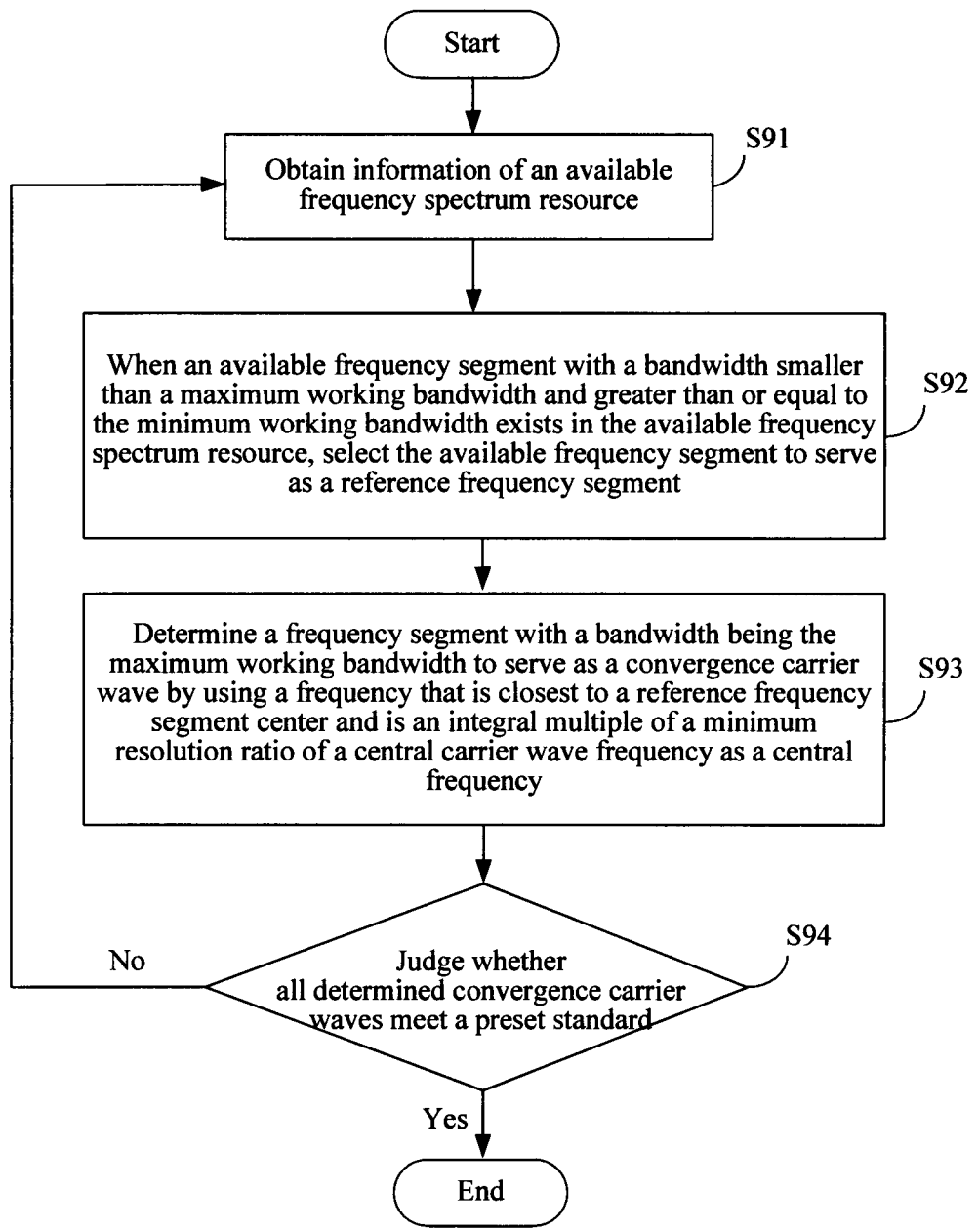
FIG. 9 is a schematic flow chart of a carrier wave convergence method according to Embodiment 5 of the present invention.

Referring to FIG. 9, FIG. 9 is a schematic flow chart of a carrier wave convergence method according to Embodiment 5 of the present invention, where the carrier wave convergence method may include the following.

S91: Obtain information of an available frequency spectrum resource.

Through the step, the available frequency spectrum resource may be found in an entire frequency spectrum resource.

S92: When an available frequency segment with a bandwidth smaller than the maximum working bandwidth and greater than or equal to the minimum working bandwidth exists in the available frequency spectrum resource, select the available frequency segment to serve as a reference frequency segment.

A 3GPP LTE system is taken as an example. If an available frequency segment that is smaller than 20 MHz and greater than 1.4 MHz exists in the frequency spectrum resource, a convergence carrier wave may be selected with the frequency segment as a reference.

S93: Determine a frequency segment with a bandwidth being the maximum working bandwidth to serve as a convergence carrier wave, by using a frequency that is closest to a center of the reference frequency segment and is an integral multiple of the minimum resolution ratio of a central carrier wave frequency as a central frequency.

In the 3GPP LTE system, the minimum resolution ratio of the central carrier wave frequency is 100 KHz. A frequency that is closest to the center of the reference frequency segment and is an integral multiple of 100 KHz may be used as a central frequency of the convergence carrier wave to determine a frequency segment of 20 MHz as the convergence carrier wave, and the convergence carrier wave includes at least two available frequency segments. In the step, the convergence carrier wave that is already determined by the system is identified as an unavailable frequency segment.

S94: Judge whether all determined convergence carrier waves meet a preset standard. If all determined convergence carrier waves meet the preset standard, end a carrier wave convergence process; if not all determined convergence carrier waves meet the preset standard, repeatedly execute step S91.

In the S94, if a sum of bandwidths of all determined convergence carrier waves already meets a convergence bandwidth requirement, and/or the number of all determined convergence carrier waves reaches the maximum carrier wave number, the carrier wave convergence process may be ended. If the sum of the bandwidths of all determined convergence carrier waves does not meet the convergence bandwidth requirement, and/or the number of all determined convergence carrier waves does not reach the maximum carrier wave number, it proves that the convergence carrier wave does not meet a preset requirement, and the convergence process needs to be continued. Therefore, step S91 and the carrier wave convergence process after step S91 are repeated. For example, if a bandwidth of 60 MHz needs to be used in high-speed communications, multiple convergence carrier waves with bandwidths smaller than or equal to 20 MHz may be converged to form the bandwidth of 60 MHz. After multiple times of convergence, a total bandwidth of the convergence carrier waves reaches 60 MHz, and the convergence process may be terminated; if the total bandwidth of the convergence carrier waves is smaller than 60 MHz, the carrier wave convergence process needs to be continued. Judging whether all determined convergence carrier waves reach the preset standard may be implemented in other manners, and is not limited by the embodiment.

In the embodiment, the frequency segment with the bandwidth smaller than the maximum working bandwidth of the system and greater than or equal to the minimum working bandwidth of the system is used as the reference, and the frequency that is equal to an integral multiple of the minimum resolution ratio of the carrier wave frequency is selected as the central frequency to perform the carrier wave convergence. The determined convergence carrier wave may include at least two available frequency segments. The carrier wave convergence method of this embodiment may be combined with the previous method that is used for communicating by using a convergence carrier wave, so that a convergence carrier wave including at least two available transmission frequency segments may work as a whole without transmitting a synchronizing/broadcasting signal in all available transmission frequency segments of the convergence carrier wave, therefore improving a frequency spectrum resource utilization ratio and decreasing complexity of data processing.

For the convenience of description, the previous method embodiments are expressed as a series of action combinations. However, those skilled in the art should understand that the present invention is not limited by an action sequence in the description. Because according to the present invention, some steps may be performed in other sequences or performed at the same time. Secondly, those skilled in the art should understand that the embodiments described in the specification all belong to exemplary embodiments. Actions and modules involved are not indispensable for the present invention.

In the embodiments, descriptions for the embodiments have different emphases. For a part not described in detail in some embodiment, references may be made to relevant descriptions in other embodiments.

In conclusion, a convergence carrier wave including at least two available transmission frequency segments in the embodiment of the present invention may work as a whole, so that the access network device may communicate with the terminal on the at least two available transmission frequency segments of the convergence carrier wave, and does not need to transmit the synchronizing/broadcasting signal in all available transmission frequency segments of the convergence carrier wave, therefore improving a frequency spectrum resource utilization ratio and decreasing complexity of data processing.

Further, the access network device and the terminal regard multiple non-continuous available frequency segments as one convergence carrier wave, and only one set of base band processing unit needs to be configured to implement data processing. Therefore complexity of data processing is further decreased, compatibility with systems in the prior art is implemented, and an implementation cost is low.

Persons of ordinary skill in the art should understand that all or a part of the steps of the methods according to the embodiments may be implemented by a program instructing relevant hardware. The program may be stored in a computer readable storage medium, and the storage medium may include a Read Only Memory (ROM), a Random Access Memory (RAM), a magnetic disk, or an optical disk.

A method for communicating by using a convergence carrier wave, an access network device, and a terminal according to the embodiments of the present invention are described in detail above. Specific embodiments are used for illustrating the principles and implementation manners of the present invention. The descriptions of the embodiments are merely for understanding the method and core ideas of the present invention. Meanwhile, persons with ordinary skill in the art may made modifications to the specific implementation manners and application scopes according to the idea of the present invention. In conclusion, the content of the specification shall not be regarded as a limitation to the present invention.

What is claimed is:

1. A method for communicating, comprising:
scheduling a signal of a system onto a first available transmission frequency segment of a carrier frequency band to transmit the signal to a terminal, wherein the carrier frequency band comprises at least two available transmission frequency segments, and wherein a bandwidth of the carrier frequency band is smaller than or equal to the maximum working bandwidth of the system;
determining to use the at least two available transmission frequency segments of the carrier frequency band to communicate with the terminal; and
communicating with the terminal on the at least two available transmission frequency segments of the carrier frequency band by mapping non-continuous transmission resources of the at least two available transmission frequency segments of the carrier frequency band to level one virtual continuous available transmission resources and assigning a transmission resource of the terminal to the level one virtual continuous available transmission resources.

2. The method according to claim 1, wherein the first available transmission frequency segment of the carrier frequency band is an available transmission frequency segment where a central frequency of the carrier frequency band is located, wherein scheduling the signal of the system onto the first available transmission frequency segment of the carrier frequency band to transmit the signal to the terminal comprises scheduling the signal of the system onto the available transmission frequency segment where the central frequency of the carrier frequency band is located to transmit the signal to the terminal, wherein the signal carries bandwidth information of the available transmission frequency segment where the central frequency of the carrier frequency band is located.

3. The method according to claim 2, wherein before determining to use the at least two available transmission frequency segments of the carrier frequency band to communicate with the terminal, the method further comprises communicating with the terminal on the available transmission frequency segment where the central frequency of the carrier frequency band is located.

4. The method according to claim 2, wherein determining to use the at least two available transmission frequency segments of the carrier frequency band to communicate with the terminal comprises sending a startup message to the terminal, wherein the startup message carries indication information of using the at least two available transmission frequency segments of the carrier frequency band to communicate with the terminal.

5. The method according to claim 4, wherein the indication information comprises at least one piece of the following information: frequency spectrum information of the at least two available transmission frequency segments of the carrier frequency band, bandwidth information of the carrier frequency band, and a startup indication signal of several bits.

6. The method according to claim 4, wherein the indication information comprises the frequency spectrum information of the at least two available transmission frequency segments of the carrier frequency band, and wherein communicating with the terminal on the at least two available transmission frequency segments of the carrier frequency band comprises:
assigning a downlink transmission resource for downlink data of the terminal on the at least two available transmission frequency segments of the carrier frequency band, notifying the terminal of a position of the downlink transmission resource assigned for the downlink data of the terminal, and scheduling the downlink data of the terminal onto the assigned downlink transmission resource for transmission; and/or
assigning an uplink transmission resource for uplink data of the terminal on the at least two available transmission frequency segments of the carrier frequency band, notifying the terminal of a position of the uplink transmission resource assigned for the uplink data of the terminal, and receiving the uplink data, which is sent by the terminal, at the position of the assigned uplink transmission resource.

7. The method according to claim 4, wherein determining to use the at least two available transmission frequency segments of the carrier frequency band to communicate with the terminal further comprises receiving a startup acknowledgment message, wherein the startup acknowledgment message carries start time information of using the at least two available transmission frequency segments of the carrier frequency band to communicate with the terminal, and the startup acknowledgment message is sent by the terminal after the terminal receives the startup message, and wherein communicating with the terminal on the at least two available transmission frequency segments of the carrier frequency band comprises communicating with the terminal on the at least two available transmission frequency segments of the carrier frequency band at the start time or after the start time.

8. The method according to claim 4, wherein the indication information comprises start time information of using the at least two available transmission frequency segments of the carrier frequency band to communicate with the terminal, and wherein communicating with the terminal on the at least two available transmission frequency segments of the carrier frequency band comprises communicating with the terminal on the at least two available transmission frequency segments of the carrier frequency band at the start time or after the start time.

9. The method according to claim 2, wherein after determining to use the at least two available transmission frequency segments of the carrier frequency band to communicate with the terminal, the method further comprises:
sending a termination message to the terminal or receiving a termination message from the terminal, wherein the termination message carries indication information of terminating use of the at least two available transmission frequency segments of the carrier frequency band for communication; and
communicating with the terminal on the available transmission frequency segment where the central frequency of the carrier frequency band is located.

10. The method according to claim 2, wherein communicating with the terminal on the at least two available transmission frequency segments of the carrier frequency band further comprises:
notifying the terminal of a position of the transmission resource assigned for uplink data and/or downlink data of the terminal; and
scheduling the downlink data of the terminal onto an assigned downlink transmission resource for transmission, and/or receiving the uplink data at a position of the transmission resource assigned for the uplink data of the terminal.

11. A method for communicating, comprising:
receiving a synchronizing signal and a broadcasting signal of a system sent by an access network device through a first available transmission frequency segment of a carrier frequency band and synchronizing with the system;
determining to use at least two available transmission frequency segments of the carrier frequency band to communicate with the access network device; and
communicating with the access network device on the at least two available transmission frequency segments of the carrier frequency band by mapping non-continuous resources of the at least two available transmission frequency segments of the carrier frequency band to level one virtual continuous available transmission resources and assigning a transmission resource of the access network device to the level one virtual continuous available transmission resources.

12. The method according to claim 11, wherein the first available transmission frequency segment of the carrier frequency band is an available transmission frequency segment where a central frequency of the carrier frequency band is located, and the broadcasting signal carries bandwidth information of the available transmission frequency segment where the central frequency of the carrier frequency band is located, and wherein before determining to use the at least two available transmission frequency segments of the carrier frequency band to communicate with the access network device, the method further comprises communicating with the access network device on the available transmission frequency segment where the central frequency of the carrier frequency band is located.

13. The method according to claim 11, wherein determining to use the at least two available transmission frequency segments of the carrier frequency band to communicate with the access network device comprises receiving a startup message, wherein the startup message carries indication information that the access network device is going to use the at least two available transmission frequency segments of the carrier frequency band for communication.

14. An access network device, comprising:
a synchronization and broadcasting module configured to schedule a signal of a system onto a first available transmission frequency segment of a carrier frequency band to transmit the signal to a terminal, wherein the carrier frequency band comprises at least two available transmission frequency segments, and wherein a bandwidth of the carrier frequency band is smaller than or equal to the maximum working bandwidth of the system;
a determination module configured to determine to use the at least two available transmission frequency segments of the carrier frequency band to communicate with the terminal; and
a first communication module configured to communicate with the terminal on the at least two available transmission frequency segments of the carrier frequency band by mapping non-continuous transmission resources of the at least two available transmission frequency segments of the carrier frequency band to level one virtual continuous available transmission resources and assigning a transmission resource of the terminal to the level one virtual continuous available resources.

15. The access network device according to claim 14, wherein the first available transmission frequency segment of the carrier frequency band is an available transmission frequency segment where a central frequency of the carrier frequency band is located, and wherein the synchronization and scheduling module is configured to schedule the signal of the system on the available transmission frequency segment where the central frequency of the carrier frequency band is located to transmit the signal to the terminal, wherein the signal carries bandwidth information of the available transmission frequency segment where the central frequency of the carrier frequency band is located.

16. The access network device according to claim 15, wherein the access network device further comprises a second communication module configured to communicate with the terminal on the available transmission frequency segment where the central frequency of the carrier frequency band is located before the determination module determines to use the at least two available transmission frequency segments of the carrier frequency band to communicate with the terminal.

17. The access network device according to claim 16, wherein the determination module is specifically configured to send a startup message to the terminal, wherein the startup message carries indication information of using the at least two available transmission frequency segments of the carrier frequency band to communicate with the terminal.

18. The access network device according to claim 17, wherein the indication information comprises frequency spectrum information of the at least two available transmission frequency segments of the carrier frequency band, and wherein the first communication module comprises:
a first assigning sub-module configured to assign a downlink transmission resource for downlink data of the terminal on the at least two available transmission frequency segments of the carrier frequency band;
a first notification sub-module configured to notify the terminal of a position of the downlink transmission resource assigned for the downlink data of the terminal; and
a first transmission sub-module configured to schedule the downlink data of the terminal onto the assigned downlink transmission resource for transmission; and/or
a second assigning sub-module configured to assign an uplink transmission resource for uplink data of the terminal on the at least two available transmission frequency segments of the carrier frequency band;
a second notification sub-module configured to notify the terminal of a position of the uplink transmission resource assigned for the uplink data of the terminal; and
a receiving sub-module configured to receive the uplink data, which is sent by the terminal, at the position of the assigned uplink transmission resource.

19. A terminal, comprising:
a synchronization module configured to receive a synchronizing signal and a broadcasting signal of a system sent by an access network device through a first available transmission frequency segment of a carrier frequency band and synchronize with the system;
a determination module configured to determine to use the at least two available transmission frequency segments of the carrier frequency band to communicate with the access network device; and
a first communication module configured to communicate with the access network device on the at least two available transmission frequency segments of the carrier frequency band by mapping non-continuous transmission resources of the at least two transmission frequency segments of the carrier frequency band to level one virtual continuous available transmission resources and assigning a transmission resource of the access network device to the level one virtual continuous available transmission resources.

20. The terminal according to claim 19, wherein the first available transmission frequency segment of the carrier frequency band is an available transmission frequency segment where a central frequency of the carrier frequency band is located, and the broadcasting signal carries bandwidth information of the available transmission frequency segment where the central frequency of the carrier frequency band is located, and wherein the terminal further comprises a second communication module configured to communicate with the access network device on the available transmission frequency segment where the central frequency of the carrier frequency band is located before the determination module determines to use the at least two available transmission frequency segments of the carrier frequency band to communicate with the access network device.

21. The terminal according to claim 19, wherein the determination module is specifically configured to receive a startup message, wherein the startup message carries indication information that the access network device is going to use the at least two available transmission frequency segments of the carrier frequency band for communication.

* * * * *